(12) United States Patent
Suzuki et al.

(10) Patent No.: US 9,598,083 B2
(45) Date of Patent: *Mar. 21, 2017

(54) VEHICLE INCLUDING A CONTROL UNIT FOR CONTROLLING A COUPLED ENGINE RUNNING MODE

(71) Applicants: Takeaki Suzuki, Susono (JP); Masaki Matsunaga, Odawara (JP); Yasunari Kido, Hadano (JP); Takayuki Kogure, Susono (JP); Yukari Okamura, Gotenba (JP); Rentaro Kuroki, Susono (JP); Takuya Hirai, Susono (JP); Masaki Mitsuyasu, Kawasaki (JP); Jonggap Kim, Hadano (JP); Akihiro Sato, Nagoya (JP); Yusuke Kinoshita, Toyota (JP)

(72) Inventors: Takeaki Suzuki, Susono (JP); Masaki Matsunaga, Odawara (JP); Yasunari Kido, Hadano (JP); Takayuki Kogure, Susono (JP); Yukari Okamura, Gotenba (JP); Rentaro Kuroki, Susono (JP); Takuya Hirai, Susono (JP); Masaki Mitsuyasu, Kawasaki (JP); Jonggap Kim, Hadano (JP); Akihiro Sato, Nagoya (JP); Yusuke Kinoshita, Toyota (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/416,774

(22) PCT Filed: Oct. 11, 2013

(86) PCT No.: PCT/IB2013/002352
§ 371 (c)(1),
(2) Date: Jan. 23, 2015

(87) PCT Pub. No.: WO2014/064504
PCT Pub. Date: May 1, 2014

(65) Prior Publication Data
US 2015/0166066 A1 Jun. 18, 2015

(30) Foreign Application Priority Data
Oct. 26, 2012 (JP) ................. 2012-237311

(51) Int. Cl.
*B60W 10/02* (2006.01)
*B60W 30/18* (2012.01)
(Continued)

(52) U.S. Cl.
CPC ...... *B60W 30/18072* (2013.01); *B60W 10/02* (2013.01); *B60W 10/06* (2013.01);
(Continued)

(58) Field of Classification Search
CPC .................. B60W 2510/20; Y10T 477/69
See application file for complete search history.

(56) References Cited

U.S. PATENT DOCUMENTS

2004/0143379 A1* 7/2004 Borroni-Bird ........ B60W 10/20
701/36
2005/0252701 A1* 11/2005 Shimizu ............... B60K 17/356
180/65.1

(Continued)

FOREIGN PATENT DOCUMENTS

JP 61-063447 U1 4/1986
JP 2002-227885 A 8/2002
(Continued)

OTHER PUBLICATIONS

Partial translation of Office Action issued on Oct. 1, 2014 for corresponding JP Patent Application No. 2012-237311.
(Continued)

*Primary Examiner* — Sherry Estremsky
*Assistant Examiner* — Lillian Nguyen
(74) *Attorney, Agent, or Firm* — Sughrue Mion, PLLC

(57) ABSTRACT

A controller is capable of controlling a coupled engine running mode, in which an engine is coupled to wheels and an engine brake is activated by driven rotation of the engine, and a coasting mode, in which an engine brake force is reduced with respect to that in the coupled engine running mode with mode with the engine brake on, and starts the coasting mode on the basis of the steering angle of a steering member. The controller starts the execution of a first coasting mode when the steering angle is equal to or less than a preset upper limit value and starts the execution of a second coasting mode when the steering angle is greater than the upper limit value. In the first coasting mode, the engine (Continued)

rotation is stopped, and in the second coasting mode, the engine remains rotating.

7 Claims, 8 Drawing Sheets

(51) Int. Cl.
    *B60W 10/06*     (2006.01)
    *F02N 11/08*     (2006.01)
    *B60W 10/26*     (2006.01)
    *B62D 5/04*     (2006.01)

(52) U.S. Cl.
    CPC ........... *B60W 10/26* (2013.01); *B62D 5/0481* (2013.01); *F02N 11/084* (2013.01); *F02N 11/0833* (2013.01); *B60W 2030/1809* (2013.01); *B60W 2030/18081* (2013.01); *B60W 2510/244* (2013.01); *B60W 2540/18* (2013.01); *B60W 2710/0616* (2013.01); *F02N 2200/0808* (2013.01); *Y02T 10/48* (2013.01); *Y10T 477/69* (2015.01); *Y10T 477/75* (2015.01)

(56) References Cited

U.S. PATENT DOCUMENTS

| | | | |
|---|---|---|---|
| 2013/0173142 A1 | 7/2013 | Kato | |
| 2014/0324305 A1* | 10/2014 | Larsson | ................ B60W 10/02 701/54 |
| 2015/0166066 A1 | 6/2015 | Suzuki et al. | |
| 2015/0298701 A1* | 10/2015 | Suzuki | ................ B60W 10/06 701/48 |

FOREIGN PATENT DOCUMENTS

| | | |
|---|---|---|
| JP | 2012-164277 A | 8/2012 |
| JP | 2014-84083 A | 5/2014 |
| WO | 2012/035601 A1 | 3/2012 |

OTHER PUBLICATIONS

Communication dated Jan. 12, 2017, issued by the U.S. Patent and Trademark Office in counterpart U.S. Appl. No. 14/439,593, 13 Pages.

* cited by examiner

| RUNNING MODE | ENGINE 12 | CLUTCH C1 | ENGINE BRAKE FORCE | FUEL CONSUMPTION | BATTERY CHARGING |
|---|---|---|---|---|---|
| USUAL RUNNING MODE | DRIVES-DRIVEN | ENGAGED | LARGE | – | ○ |
| FREE-RUN COASTING MODE | F/C – ROTATION IS STOPPED | DISENGAGED | SMALL | ◎ | × |
| NEUTRAL COASTING MODE | IDLE ROTATION | DISENGAGED | SMALL | ○ | ○ |

| RUNNING MODE | ENGINE 12 | CLUTCH C1 | ENGINE BRAKE FORCE | FUEL CONSUMPTION | BATTERY CHARGING |
|---|---|---|---|---|---|
| USUAL RUNNING MODE | DRIVES-DRIVEN | ENGAGED | LARGE | − | ○ |
| FREE-RUN COASTING MODE | F/C − ROTATION IS STOPPED | DISENGAGED | SMALL | ◎ | × |
| CYLINDER CUT-OFF COASTING MODE | F/C − DRIVEN ROTATION | ENGAGED | MEDIUM | ○ | ○ | though
VEHICLE INCLUDING A CONTROL UNIT FOR CONTROLLING A COUPLED ENGINE RUNNING MODE

BACKGROUND OF THE INVENTION

1. Field of the Invention

The invention relates to a vehicle, and more particularly to a technique for further improving fuel economy while inhibiting battery degradation in a vehicle capable of coasting, that is, running in a state with an engine brake force reduced with respect to that in an engine brake running mode.

2. Description of Related Art

A coasting mode in which an engine brake force is reduced with respect to that in the engine brake running mode, in which the engine is coupled to the wheels and the engine brake is activated, has been considered for extending the running distance and improving fuel economy over those in the engine brake running mode. In the apparatus described in Japanese Patent Application Publication No. 2002-227885 (JP-2002-227885 A), two control modes, namely, the first coasting mode in which the engine rotation is stopped and the second coasting mode in which the vehicle runs, while the engine rotates are suggested by way of example. More specifically, in the first coasting mode, free-run coasting is performed in which the clutch is released, the engine is disconnected from the wheels, fuel supply to the engine is stopped, and engine rotation is stopped. In the second coasting mode, neutral coasting is performed in which the clutch is released, the engine is disconnected from the wheels and in this state fuel is supplied to actuate (cause self-rotation) the engine. Either of those coasting modes is executed under certain conditions practically in the same way.

However, JP-2002-227885 A describes a steering angle of a steering wheel as a coasting execution condition, and when the steering angle is equal to or less than a predetermined angle, the two coasting modes are executed in the same way.

SUMMARY OF THE INVENTION

Meanwhile, in a vehicle equipped with an electric power steering system, which electrically assists the driver's steering operation, battery power consumption differs between the first and second coasting modes that differ in the engine state. Thus, vehicles are typically provided with an alternator that generates power by using the engine rotation, but in the first coasting mode in which the engine rotation is stopped, the battery cannot be charged and, therefore, the actuation of the electric power steering system during a steering operation reduces the residual battery capacity. By contrast, in the second coasting mode in which the engine rotates, the battery is successively charged and, therefore, the residual battery capacity is ensured regardless of the operation of the electric power steering system. However, since the engine rotates thereby causing engine loss, fuel economy is degraded with respect to that in the first coasting mode. Further, since battery degradation is enhanced by significant variations in the residual capacity due to battery properties, it is desirable that variations in the residual capacity of the battery be minimized.

It follows from the above, that the first coasting mode in which the engine rotation is stopped is preferred from the standpoint of improving fuel economy, and the second coasting mode in which the engine rotates is preferred from the standpoint of reducing the consumption of battery power. Thus, the first and second coasting modes have different characteristics in terms of fuel economy and consumption of battery power. However, in JP-2002-227885 A, those coasting modes are performed in the same way in a certain steering angle range. Therefore, there is still room for improvement in terms of preventing battery degradation and improving fuel economy. In JP-2002-227885 A, the consumption of battery power during coasting is not taken into account at all when determining whether to set the engine state to "rotation" (second coasting mode) or "stop" (first coasting mode), and both the fuel economy and the consumption of power are imperfect as conditions for executing the coasting mode.

The invention provides a vehicle equipped with a controller that enables coasting in a state in which the engine brake force is reduced by comparison with that in the engine brake running mode, and further improves fuel economy while inhibiting battery degradation.

According to a first aspect of the invention, a vehicle includes: an engine; an alternator configured to generate power by rotation of the engine; a battery configured to accumulate power generated by the alternator; a steering member operated by a driver; an electric power steering system configured to assist the driver to operate the steering member by using power of the battery; a steering angle acquisition unit configured to acquire a steering angle of the steering member; and a controller. The controller is configured to be capable of controlling a coupled engine running mode, in which the engine is coupled to wheels and engine brake is activated by the driven rotation of the engine and a coasting mode in which an engine brake force is reduced with respect to that in the coupled engine running mode with the engine brake engaged, and also configured to start the coasting mode on the basis of the steering angle of the steering member. The controller is also configured to start the execution of a first coasting mode when the steering angle is equal to or less than a preset upper limit value α and start the execution of a second coasting mode when the steering angle is greater than the upper limit value α. The first coasting mode is a coasting mode in which the engine rotation is stopped, and the second coasting mode is a coasting mode in which the engine remains rotating.

In the controller, the first coasting mode and the second coasting mode are both executed as the coasting modes, and the execution of the first coasting mode in which the engine rotation is stopped is started subject to the steering angle being equal to or less than the upper limit value α. In the first coasting mode, the alternator cannot generate power. Therefore, where the driver performs a steering operation, the residual capacity of the battery decreases as the electric power steering system operates. However, since the execution of the coasting mode is started only in a range with a comparatively small steering angle that is equal to or less than the upper limit value α, the decrease in the residual capacity of the battery is small and battery degradation caused by variations in the residual capacity is inhibited. Further, in the first coasting mode, since the engine rotation is stopped, excellent improvement of fuel economy is obtained.

Meanwhile, the execution of the second coasting mode in which the engine remains rotating is started even when the steering angle is greater than the upper limit value α. In the second coasting mode, the battery is charged by the power generated by the alternator. Therefore, the decrease in the residual capacity of the battery caused by the operation of the electric power steering system is small and good battery performance is maintained. Further, since the second coasting mode is executed also in the range in which the steering angle is greater than the upper limit value α, fuel economy is improved over that in the engine brake running mode.

Thus, where the upper limit value of the steering angle for performing the first and second coasting modes is increased in the same manner with consideration for fuel economy, in the first coasting mode in which the engine rotation is stopped, the residual capacity of the battery is greatly reduced and the battery is degraded by the operation of the electric power steering system. The decrease in residual capacity makes it necessary to start the engine, and frequent start/stop operations of the engine can make the driver uncomfortable. Conversely, where the upper limit value of the steering angle for performing the first and second coasting modes is decreased in the same manner with consideration for maintaining the battery performance, in the second coasting mode in which the engine rotates, the battery is charged by the power generated by the alternator and the residual capacity is adequately maintained even when the electric power steering system is actuated, but sufficient improvement in fuel economy promised by the coasting mode cannot be obtained. By contrast, with the invention of the application, different upper limits of the steering angle are provided for starting the execution of the first coasting mode and the second coasting mode on the basis of whether or not the battery can be charged, with consideration for power consumption on the operation of the electric power steering system. Therefore, the steering angle range for executing the coasting mode while inhibiting battery degradation can be expanded and fuel economy can be further improved, regardless of power consumption on the operation of the electric power steering system.

In the vehicle according to the aspect, the controller may start the execution of the second coasting mode when the steering angle is in a range equal to or less than the upper limit value α, and selectively starts the execution of the first coasting mode or the second coasting mode in the range equal to or less than the upper limit value.

Therefore, the opportunity for coasting can be increased and fuel economy can be further improved by selecting the type of the coasting mode according to the running state or vehicle state.

In the vehicle according to the aspect, the controller may perform control to change over to the second coasting mode when the steering angle exceeds the upper limit value α in the course of executing the first coasting mode.

With such a configuration, the coasting is performed while the battery is charged by the power generated by the alternator. Thus, battery degradation caused by the decrease in residual capacity is inhibited, regardless of the increase in power consumption caused by the operation of the electric power steering system. At the same time, the first coasting mode is executed when the steering angle is equal to or less than the upper limit value α and the second coasting mode is executed in the range above the upper limit value α, thereby enabling excellent improvement, in fuel economy.

In the vehicle according to the aspect, the controller may perform control to change over to the first coasting mode when the steering angle becomes equal to or less than the upper limit value α in the course of executing the second coasting mode.

The steering angle becoming equal to or less than the upper limit value α means that the steering wheel is returned, and in this case, power consumption on the operation of the electric power steering system is reduced. Therefore, by changing over to the first coasting mode and stopping the engine rotation, it is possible to obtain excellent improvement in fuel economy while inhibiting battery degradation caused by the reduction in residual capacity.

In the vehicle according to the aspect, in the first coasting mode, the engine may be disconnected from the wheels and fuel supply to the engine may be stopped to stop the engine rotation (free-run coasting), and in the second coasting mode, fuel may be supplied to actuate the engine in a state in which the engine is disconnected from the wheels (neutral coasting).

In the neutral coasting mode, the engine is actuated by fuel supply. Therefore, fuel economy is worsened accordingly in comparison with operation in the free-run coasting mode. However, since the engine is disconnected from the wheels in the neutral coasting mode, the engine brake force is substantially zero, the running distance during coasting is extended, and the frequency of reacceleration is decreased. Therefore, fuel economy as a whole can be improved over that in the engine brake running mode.

Thus, in either case, the engine brake force is reduced, the running distance during coasting is extended, and fuel economy can be increased by comparison with those in the engine brake running bode.

In the vehicle according to the aspect, in the first coasting mode, the engine may be disconnected from the wheels and fuel supply to the engine may be stopped to stop the engine rotation (free-run coasting), and in the second coasting mode, fuel supply to the engine may be stopped, while the engine remains coupled to the wheels, and the operation of a piston and at least one of an intake valve and exhaust valve in at least one of cylinders of the engine may be stopped (cylinder cut-off coasting).

In the cylinder cut-off coasting mode, the crankshaft is rotated according to the vehicle speed or the like, but when a piston is stopped, the engine brake force is reduced correspondingly to a loss (rotation resistance) caused by the pumping effect. Further, when the intake/exhaust valve is stopped in a closed state or an open state, the loss caused by the pumping effect is decreased and the engine brake force is also reduced by comparison with that when the valve is opened/closed synchronously with the crankshaft.

Thus, in either case, the engine brake force is reduced, the running distance during coasting is extended, and fuel economy can be increased by comparison with those in the engine brake running mode.

In the vehicle according to the aspect, the vehicle may further include a residual capacity acquisition unit configured to acquire the residual capacity of the battery, wherein the controller variably sets the upper limit value and may set a smaller upper limit value when the residual capacity of the battery is small than when the residual capacity of the battery is large.

With such a configuration, the execution of the first coasting mode is restricted to a smaller steering angle range, and power consumption on the operation of the electric power steering system is reduced. Therefore, even when the residual capacity of the battery is small, battery degradation caused by the decrease in residual capacity can be inhibited, while enjoying the benefits of improved fuel economy which are due to the execution of the first coasting mode.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
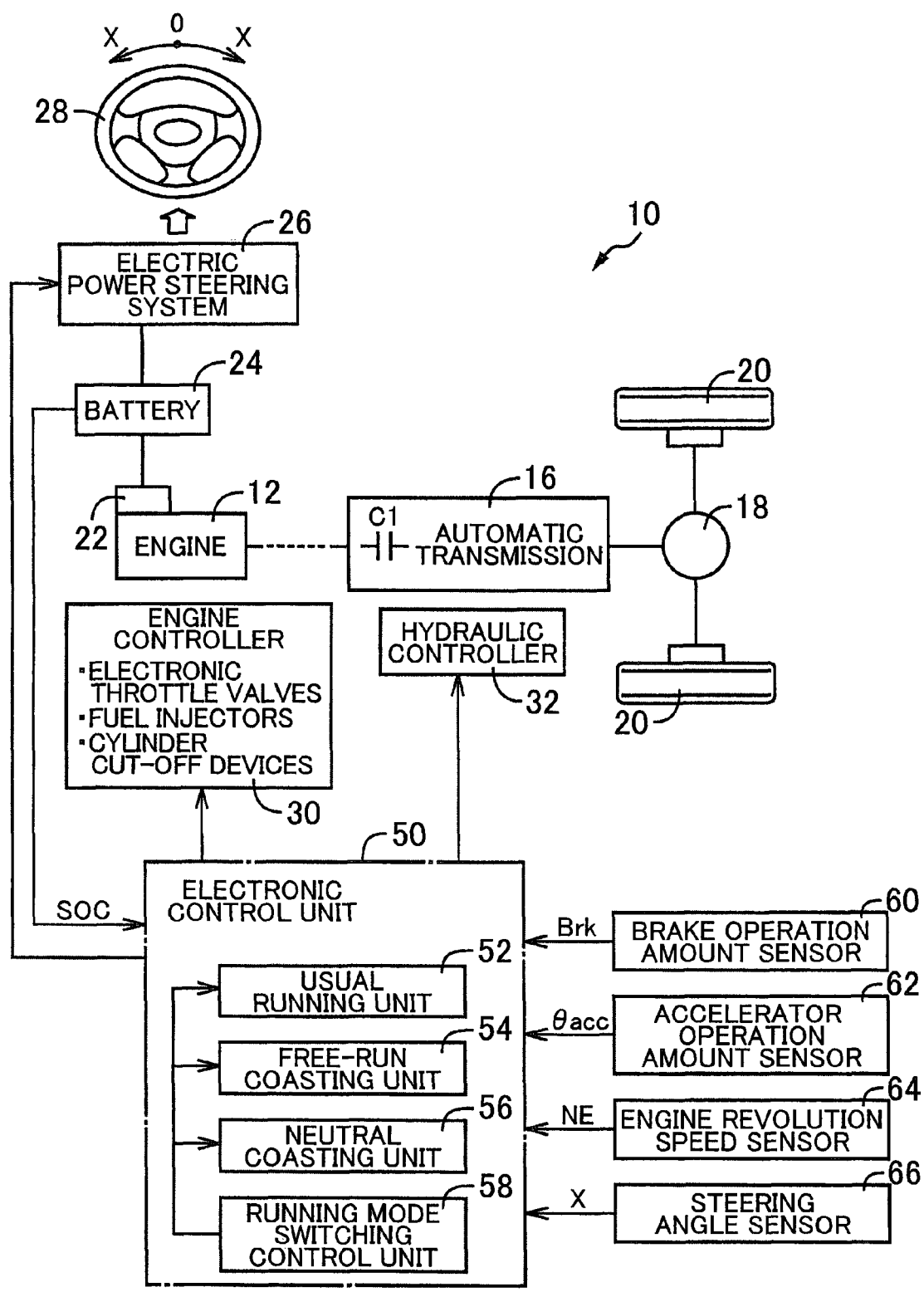
FIG. 1 is a schematic structural diagram in which the main components of a control system are additionally shown in the skeleton diagram of a vehicle drive apparatus advantageously using the invention.

The invention can be applied to a vehicle equipped at least with an engine as a drive power source, preferably an engine-driven vehicle. The invention can be also applied to a hybrid vehicle equipped with an electric motor or a motor generator, in addition to an engine, as a drive power source. The engine is an internal combustion engine in which power is generated by combustion of fuel. An alternator generates power by the engine rotation and charges a battery. The alternator is configured, for example, to include a diode for current rectification or a generator, but can be also configured using a motor-generator that can be also used as an electric motor. An electric power steering system is configured to assist a steering operation, for example, with an electric motor. The steering operation may be also assisted by a hydraulic pressure generated by an electric oil pump. The power steering assist means that the steering operation is assisted on the basis of power from the battery. A steering angle may be the actual steering angle of a steering wheel, or may be determined from parameters changing in relation to the steering angle. For example, where the assist is performed with an electric motor, the steering angle can be detected from the assist torque.

A connection/disconnection device that connects/disconnects the engine to/from the wheels is provided therebetween and configured to be capable of disengaging the engine from the wheels. A friction engagement clutch or brake is preferably used as the connection/disconnection device, but various other connection/disconnection devices, for example, such that electrically control the counterforce to enable/disable power transmission, can be also used. An automatic transmission provided with a plurality of clutches and brakes and capable of switching to a neutral mode can be also used.

In the engine brake running mode during coupled engine running, all of the engine cylinders are driven and rotated, whereby an engine brake force is generated by a rotation resistance such as pumping loss or friction torque. In this case, the engine may be in a F/C state in which fuel supply is stopped, or in an operation state such as an idle state in which a predetermined amount of oil is supplied to the engine. In the idle state, the engine brake force is generated by driving and rotating the engine at a revolution speed corresponding to the vehicle speed or the like.

The first coasting mode is a free-run coasting mode in which the engine is disconnected from the wheels, for example, by the connection/disconnection device, the supply of fuel to the engine is stopped, and the engine rotation is stopped. The second coasting mode is a neutral coasting mode in which the engine is disconnected from the wheels, for example, by the connection/disconnection device and fuel is supplied to the engine in this state to operate (self-rotation) the engine, or a cylinder cut-off coasting mode in which the supply of fuel to the engine is stopped, while the engine is coupled to the wheels by the connection/disconnection device, and the operation of a piston and at least one of an intake valve and exhaust valve in at least one of cylinders of the engine is stopped. The pistons and intake/exhaust valves can be mechanically stopped, for example, by disengaging a clutch mechanism provided between the pistons or intake/exhaust valves and the crankshaft. For example, where electromagnetic intake/exhaust valves that can be open/close controlled independently from the crankshaft rotation are used, the operation, thereof may be stopped. The stopping position of the intake/exhaust valves is established, as appropriate. For example, the stopping position for all of the intake/exhaust valve can be that of a closed state, or that of an open state. The invention can be also used when as the second coasting mode the neutral coasting mode and cylinder cut-off coasting mode are executed in combination, depending on conditions.

The invention relates to determining the execution start for the first coasting mode and second coasting mode and includes a steering angle as a start condition. However, in addition to the steering angle, for example, the requested output amount, such as the accelerator operation amount, being zero (accelerator OFF) and the requested brake amount, such as the brake operation amount, being zero (brake OFF) can be also set, as appropriate, as the start condition. As for the conditions for starting the execution of the first coasting mode and second coasting mode, for example, it is determined that where the steering angle is equal to or less than the upper limit value α, the execution of the first coasting mode is started, and where the upper limit value α is exceeded, the execution of the second coasting mode is started. Further, in the second coasting mode, power can be generated by the alternator by using the engine rotation. Therefore, the execution start of the first coasting mode may be restricted according to the need for electric energy, such as in the case where the residual capacity of the battery is equal to or less than a predetermined amount, and the second coasting mode may be executed even when the steering angle is equal to or less than the upper limit value α. The execution start condition for each coasting mode is set, as appropriate, on the basis of the vehicle state or running state.

The end conditions for ending the execution of the first coasting mode and second coasting mode can be set as appropriately. For example, the coasting mode execution may be ended in the case of deviation from the execution start condition. The end condition different from the execution start condition can be also set. For example, even when the requested output amount or requested brake amount is changed from OFF to ON, for example, by depressing the accelerator pedal or brake pedal, the first coasting mode or second coasting mode may be continued till the requested amount thereof becomes equal to or greater than a predetermined value. Different values of the steering angle may be also set as the execution start condition and end condition, or no condition relating to the steering angle may be set as the end condition. The execution of the first coasting mode may be also ended on the basis of the variation amount of the steering angle.

The execution of the second coasting mode may be also started when the steering angle is greater than the upper limit value $\alpha$, or the execution of the second coasting mode may be started without setting the upper limit. It is also possible to set an upper limit value $\beta$ ($>\alpha$) for the second coasting mode, and prohibit the execution start of the second coasting mode and maintain the coupled engine running when the steering angle is greater than the upper limit value $\beta$.

According to the second aspect of the invention, the execution of the second coasting mode can be started also in a steering angle range equal to or less than the upper limit value $\alpha$. For example, a configuration can be used such that the execution of the second coasting mode can be started, for example, when the steering angle is equal to or less than the upper limit value $\beta$, including a no-steering case in which the steering angle is substantially zero, but in another embodiment of the invention, the execution of the second casting mode may be started, provided that the steering angle is equal to greater than the upper limit value $\alpha$.

According to the third aspect of the invention, when the steering angle exceeds the upper limit value $\alpha$ while the first coasting mode is executed, a change-over is made to the second costing mode, but in another embodiment of the invention, a change-over can be made back to the coupled engine mode or to another running mode in which the engine is rotated. According to the fourth aspect of the invention, when the steering angle becomes equal to or less than the upper limit value $\alpha$ while the second coasting mode is executed, a change-over is made to the first costing mode, but in another embodiment of the invention, the second coasting mode may be continued, as is, or a change-over can be made back to the coupled engine mode. In the third and fourth aspects of the invention, it is not necessary that the change-over between the first coasting mode and second coasting mode be made at all times, and this change-over may be made only under a predetermined condition.

A predetermined value may be set as the upper limit value $\alpha$, but the upper limit value can be also variably set according to the vehicle state or running state, for example, the residual capacity of the battery. When the upper limit value $\alpha$ is set according to the residual capacity of the battery, for example, where the upper limit value which is set when the residual capacity is small is less than that set when the residual capacity is large, the execution of the first coasting mode is restricted to a smaller steering angle range and the power consumed on the operation of the electric power steering system is reduced. As a result, even when the residual capacity of the battery is small, battery degradation caused by the decrease in residual capacity can be inhibited, while enjoying the benefits of improved fuel economy which is due to the execution of the first coasting mode. Such variable setting of the upper limit value $\alpha$ may be performed by varying the upper limit value $\alpha$ continuously or in a stepwise manner, e.g. in two stages, and it can be done in advance by using a data map or a computational formula.

Embodiments of the invention will be described below with reference to the drawings. FIG. 1 is a schematic structural diagram in which the main components of a control system are additionally shown in the skeleton diagram of a vehicle drive apparatus 10 advantageously using the invention. The vehicle drive apparatus 10 is provided with an engine 12 which is an internal combustion engine, such as a gasoline engine or a diesel engine, generating power by fuel combustion, as a drive power source. The output of the engine 12 is transmitted from an automatic transmission 16 to left and right wheels 20 via a differential gear device 18. A power transmission device such as a damper device or a torque converter is provided between the engine 12 and the automatic transmission 16, but a motor-generator functioning as a drive power source can be also provided.

An alternator 22 is connected by a belt or the like to the engine 12 and generates power by rotating following the rotation of the engine 12. The generated power is used to charge a battery 24. The vehicle drive apparatus 10 of the embodiment is also provided with an electric power steering system 26 that electrically assists the steering operation, which is performed by the driver, by using the power of the battery 24, thereby reducing the operation force necessary for the driver to rotate (steer) a steering wheel 28. For example, a system in which the steering operation is assisted by the rotation torque of an electric motor can be used as the electric power steering system 26. In this case, the steering wheel 28 is an example of a steering member.

The engine 12 is provided with an engine controller 30 having a cylinder cut-off device or various devices necessary to control the output of the engine 12, such as electronic throttle valves and fuel injectors. The electronic throttle valves control the intake air amount, and the fuel injectors control the fuel injection amount. The electronic throttle valves and fuel injectors are basically controlled according to the operation amount of an accelerator pedal (accelerator operation amount) $\theta$acc, which is the output amount requested by the driver. The fuel injectors can stop the supply of fuel—F/C—in an accelerator OFF mode in which the accelerator operation amount $\theta$acc is zero even as the vehicle runs. The cylinder cut-off device can mechanically disconnect some or all of the intake/exhaust valves of a plurality of cylinders, for example, eight cylinders, from a crankshaft with a clutch mechanism or the like, and stop the valves. For example, all of the intake/exhaust valves are stopped at a position corresponding to a closed state. As a result, in the F/C state, the pumping loss occurring when the engine 12 is driven and rotated is reduced, the engine brake force is reduced, and the running distance of coasting can be extended. The alternator 22 is connected to the crankshaft and generates power by rotating following the rotation of the crankshaft, regardless of the cylinder cut-off operation.

The automatic transmission 16 is a stepped automatic transmission, for example, of a planetary gear system in which a plurality of gear stages with different shift ratios e are set according to the engagement/disengagement state of a plurality of hydraulic friction engagement devices (clutches or brakes). Shifting in the automatic transmission is controlled by electromagnetic hydraulic control valves or switching valves provided in a hydraulic controller 32. A clutch C1 functions as the input clutch of the automatic transmission 16 and is engagement/disengagement controlled also by the hydraulic controller 32. The clutch C1 corresponds to a connection/disconnection device that connects/disconnects the engine 12 to/from the wheels 20. A continuously variable transmission of a belt system or the like can be used instead of the stepped transmission as the automatic transmission 16.

The vehicle drive apparatus 10 of the above-described configuration is provided with an electronic control unit 50. The electronic control unit 50 is configured to include the so-called microcomputer having a central processing unit (CPU), a read-only memory (ROM), a random access memory (RAM), and an input/output interface and performs signal processing according to, a program that has been stored in advance in the ROM, while using the temporary storage function of the RAM. The electronic control unit 50 receives a signal representing the operation force of the brake pedal (brake operation force) Brk from a brake operation amount sensor 60, and a signal representing the operation amount of the accelerator (accelerator operation amount) θacc from an accelerator operation amount sensor 62. Further, a signal representing the revolution speed of the engine 12 (engine revolution speed) NE is supplied from an engine revolution speed sensor 64, and a signal, representing the steering angle X of the steering wheel 28 is supplied from a steering angle sensor 66. A signal representing the residual capacity SOC of the battery 24 is also supplied to the electronic control unit. In addition, various types of information necessary for various types of control are also supplied thereto. The steering angle sensor 66 is an angle sensor and detects the steering angle X, which is a positive (+) angle for both the leftward and rightward rotation by taking the steering angle X of straight linear movement of the vehicle as zero. For example, the voltage value of the battery 24 may be read as the residual capacity SOC, but it may be also calculated from the charge-discharge amount. The brake operation force corresponds to the brake amount requested by the driver, and the accelerator operation amount corresponds to the output amount requested by the driver.

In terms of functions, the electronic control unit 50 is provided with a usual running unit 52, a free-run coasting unit 54, a neutral coasting unit 56, and a running mode switching control unit 58. The usual running unit 52, free-run coasting unit 54, and neutral coasting unit 56 execute the three running modes shown in FIG. 2. The usual running unit 52 executes the usual running mode V. The usual running is performed in a power transmission state in which the clutch C1 is engaged and the engine 12 and the wheels 20 are connected by the automatic transmission 16. The usual running mode can be the engine drive running mode in which the engine 12 is operated according to the accelerator operation amount θacc, and also the engine brake running mode in which the engine 12 is in the idle state or a F/C state, in which the supply of fuel is stopped, and rotated according to the vehicle speed. In the engine brake running mode, a comparatively large engine brake is generated due to a pumping loss or a friction torque as a result of all of the cylinders of the engine 12 being driven. Further, in the usual running mode, the alternator 22 rotates following the rotation of the engine 12, regardless of whether or not the engine brake running mode is realized, and the battery 24 is charged. The usual running mode is an example of the coupled engine running mode.

The free-run coasting unit 54 executes the free-run coasting mode according to a preset execution condition such as an accelerator OFF condition. The free-run coasting mode is executed in a state in which the clutch C1 is disengaged, the engine 12 is disconnected from the wheels 20, the F/C is performed that stops the supply of fuel to the engine 12, and the rotation of the engine 12 is stopped. In this case, the engine brake force is less than that in the engine brake running mode, and since the clutch C1 is disengaged, the engine brake force becomes substantially zero. Therefore, the running resistance is decreased and the running distance in the coasting mode is extended. In addition, since the supply of fuel to the engine 12 is stopped, fuel economy can be greatly imported. Further, since the rotation of the engine 12 is stopped, the rotation of the alternator 22 is also stopped and the battery 24 cannot be charged. In the embodiment, the free-run coasting mode is executed as the first coasting mode.

The neutral coasting unit 56 executes the neutral coasting mode according to a preset execution condition, such as the accelerator OFF condition. The neutral coasting mode is executed in a state in which the clutch C1 is disengaged and the engine 12 is disconnected from the wheels 20, but the fuel is supplied to the engine 12 and the engine is operated (self-rotated) in the idle state. In this case, the engine brake force is also less than that in the engine brake running mode, and since the clutch C1 is disengaged, the engine brake force becomes substantially zero. Therefore, the running resistance is decreased, the running distance in the coasting mode is extended, and fuel economy can be greatly improved. Further, since the engine 12 is operated in the idle state, the fuel is consumed, but the coasting distance is increased over that in the usual engine brake running mode in which the engine 12 is connected to the wheels 20, and the frequency of re-acceleration is decreased. Therefore, fuel economy as a whole is improved. Further, since the engine 12 is rotated in the idle state, the alternator 22 rotates following the engine rotation, and the battery 24 is charged. In the embodiment, the neutral coasting mode is executed as the second coasting mode.

Figures 2, 3:
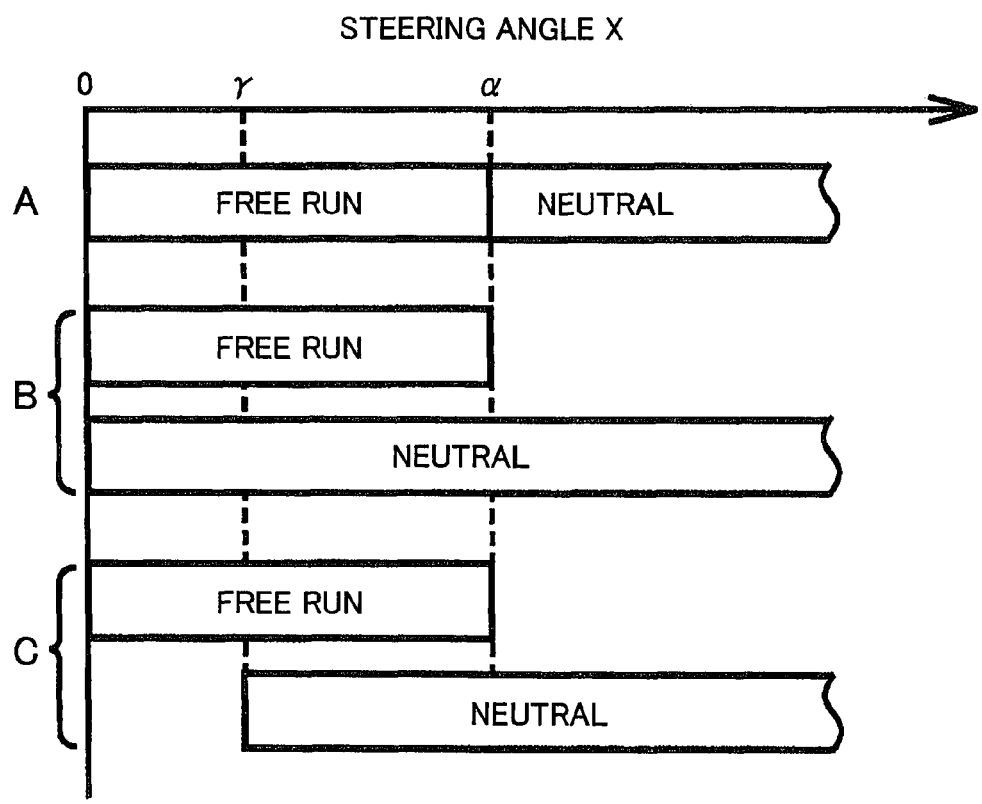
FIG. 2 illustrates three running modes executed by the vehicle drive apparatus shown in FIG. 1.
FIG. 3 illustrates the difference in the execution range between the free-run coasting mode and the neutral coasting mode executed by the vehicle drive apparatus shown in FIG. 1, the difference being associated with the steering angle X.

The running mode switching control unit 58 switches the three running modes, namely, the usual running mode, free-run coasting mode, and neutral coasting mode, according to the conditions (execution conditions) indicated, for example, by (A) to (C) in FIG. 3 with respect to the steering angle X. Those conditions may be set to include at least the steering angle X, or the execution of the running modes may be started and ended according to conditions other than the steering angle X. FIG. 3 shows the execution start conditions for the free-run coasting mode and the neutral coasting mode that relate to the steering angle X. In the embodiment, the running modes are switched according to the conditions same as the execution start conditions relating to the steering angle X in the course of executing those coasting modes.

In the case (A) in FIG. 3, the free-run coasting mode is executed when the steering angle X is equal to or less than the upper limit value α, including the no-steering case with the steering angle X=0, and the neutral coasting mode is executed when the steering angle X is greater than the upper limit value α. The upper limit value α is an upper limit value for executing the free-run coasting mode, and where this upper limit value α is exceeded, the free-run coasting is ended.

The case (B) is similar to the case (A) in that the free-run coasting mode is executed when the steering angle X is equal to or less than the upper limit value α, including the no-steering case with the steering angle X=0, but different in that the neutral coasting mode can be executed when the steering angle X is equal to or less than the upper limit value α, including the no-steering case with the steering angle X=0. Thus, where the steering angle X is equal to or less than the upper limit value α, the free-run coasting mode and the neutral coasting mode are executed according to preset conditions. For example, when a brake booster is provided that boosts the brake force by using a negative pressure generated by the engine rotation, the brake force boosting action is reduced in the free-run coasting mode in which the engine rotation is stopped. Therefore, where the possibility of braking is high, for example, on a comparatively steep slope or at a high vehicle speed, various execution conditions can be set on the basis of the running state or vehicle state, for example, so as to restrict the free-run coasting mode and execute the neutral coasting mode even when the steering angle X is equal to or less than the upper limit value α. In this case, it is preferred that switching be performed to the neutral coasting mode when the steering angle X exceeds the upper limit value α in the course of executing the free-run coasting mode at a steering angle equal to or less than the upper limit value α, but a normal mode may be implemented without performing switching.

The case (C) is substantially identical to the case (B), but where a lower limit value γ, which is a lower limit value for executing the neutral coasting mode, is set separately from the steering angle X=0, a value less than the upper limit value α is set. In such a case, the free-run coasting mode may be executed at a steering angle less than the lower limit value γ and switching to the neutral coasting mode may be made, as necessary, when the steering angle becomes equal to or greater than the lower limit value γ, but it is also possible to execute the neutral coasting mode when the steering angle becomes equal to or greater than the lower limit value γ, without executing the free-run coasting mode.

Figure 4:
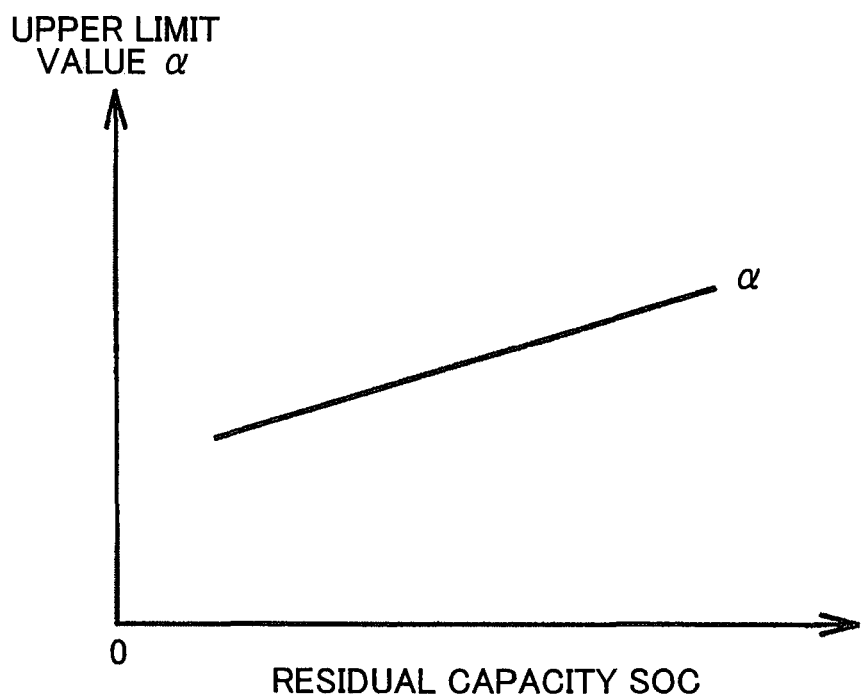
FIG. 4 illustrates an example of data map in the case where the upper limit value α is set according to the residual capacity—state of charge (SOC)

A certain value may be preset as the upper limit value α, but it is also possible to set the upper limit value variably by using the residual capacity SOC of the battery 24 as a parameter, for example, as shown in FIG. 4. Thus, since the battery 24 is not charged in the free-run coasting mode, the upper limit value α is set smaller and the execution range of the free-run coasting mode relating to the steering angle X is made narrower when the residual capacity SOC is small than when it is large. As a result, power consumption on the operation of the electric power steering system 26 during the free-run coasting is reduced and the decrease in the residual capacity SOC of the battery 24 is inhibited. Such an upper limit value α is set in advance by using a data map or a computational formula.

Figure 5:
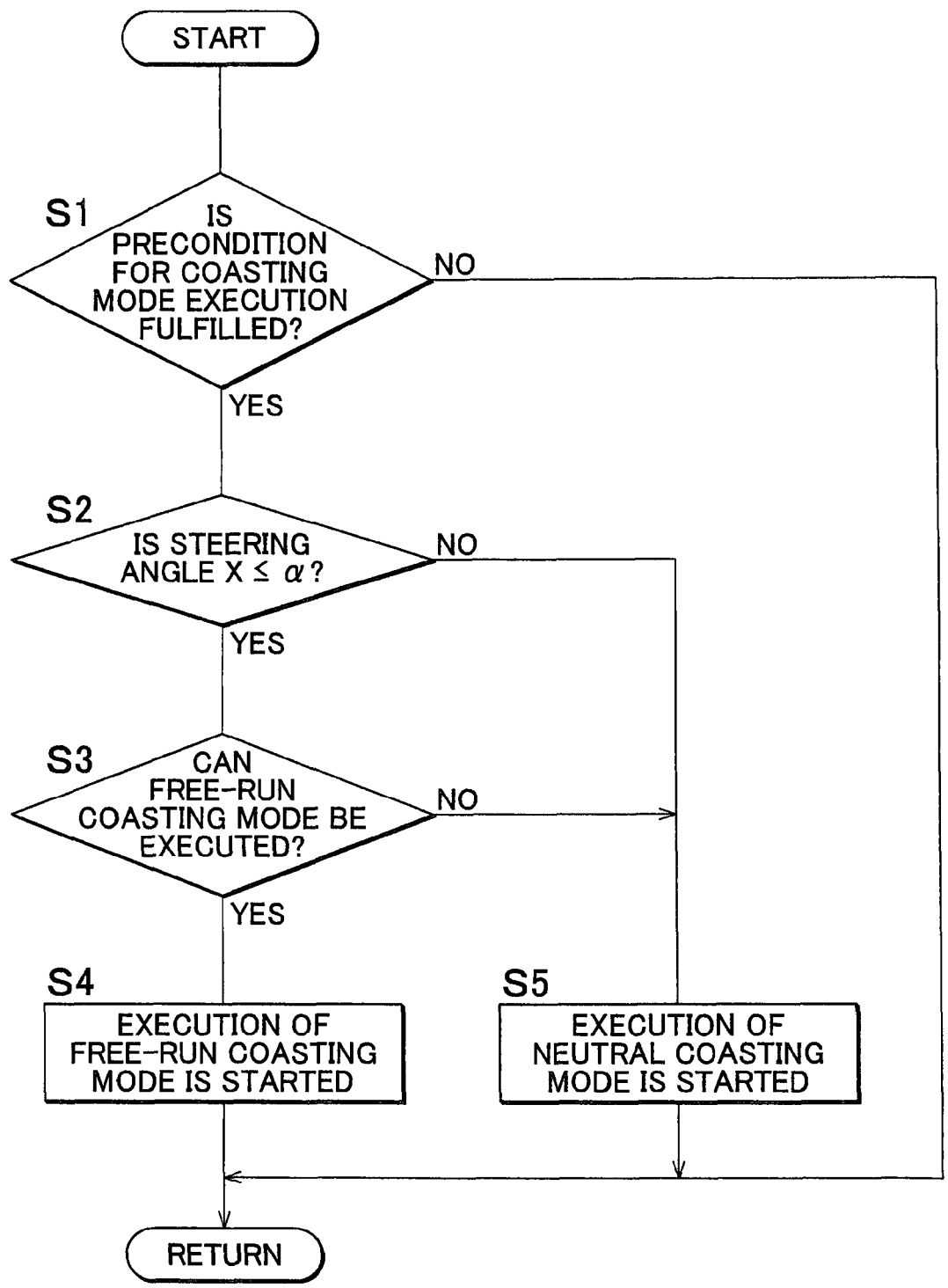
FIG. 5 is a flowchart illustrating the operations relating to the execution start determination of the coasting modes executed by the electronic control unit shown in FIG. 1.

FIG. 5 is a flowchart relating to the operation performed when the execution start for the free-run coasting mode and the neutral coasting mode is determined by the running mode switching control unit 58. In step S1, it is determined whether or not a precondition for starting the execution of either of the free-run coasting mode and the neutral coasting mode is fulfilled. The precondition is, for example, that the accelerator OFF state (no operation) in which the accelerator operation amount θacc is substantially zero, or the brake OFF state (no operation) in which the brake operation force Brk is substantially zero is maintained for a certain period of time or longer. Where the precondition is fulfilled, the processing flow advances to step S2 and subsequent steps.

In step S2, it is determined whether or not the steering angle X is equal to or less than the upper limit value α, and where X>α, the execution of the neutral coasting mode is started in step S5. Where X≤α, step S3 is executed after step S2, and it is determined whether the free-run coasting mode can be executed (is appropriate) on the basis of a preset execution enabling condition. When the execution enabling condition is fulfilled, the execution of the free-run coasting mode is started in step S4. Where the execution enabling condition is not fulfilled, the execution of the neutral coasting mode is started in step S5. The execution enabling condition is set such that the execution of the free-run coasting mode in which the brake force cannot be boosted by the brake booster is prohibited when the possibility of braking is high, for example, on a comparatively steep slope or at a high vehicle speed. The execution enabling condition is set, as appropriate, on the basis of the vehicle state or running state so as to prohibit the free-run coasting mode even when the residual capacity SOC of the battery 24 is equal to or less than a predetermined value.

The flowchart shown in FIG. 5 relates to the execution start determination for the coasting modes, but the steps similar to step S2 and subsequent steps are also executed in relation to the steering angle X in the course of executing the free-run coasting mode or the neutral coasting mode, and those coasting modes are switched, as appropriate, in response to variations in the steering angle X. In the case (A) shown in FIG. 3, the step S3 may be omitted and the free-run coasting mode may be executed at all times when X≤α. Further, where the determination of step S2 or S3 is NO (negative), the execution of the neutral coasting mode is started in step S5 in the same manner, but the execution enabling condition for determining whether or not the neutral coasting mode can be executed (is appropriate) is set separately. Where this execution enabling condition may be fulfilled, the execution of the neutral coasting mode may be started, and where the condition is not fulfilled, the usual running mode may be maintained.

Figure 6:
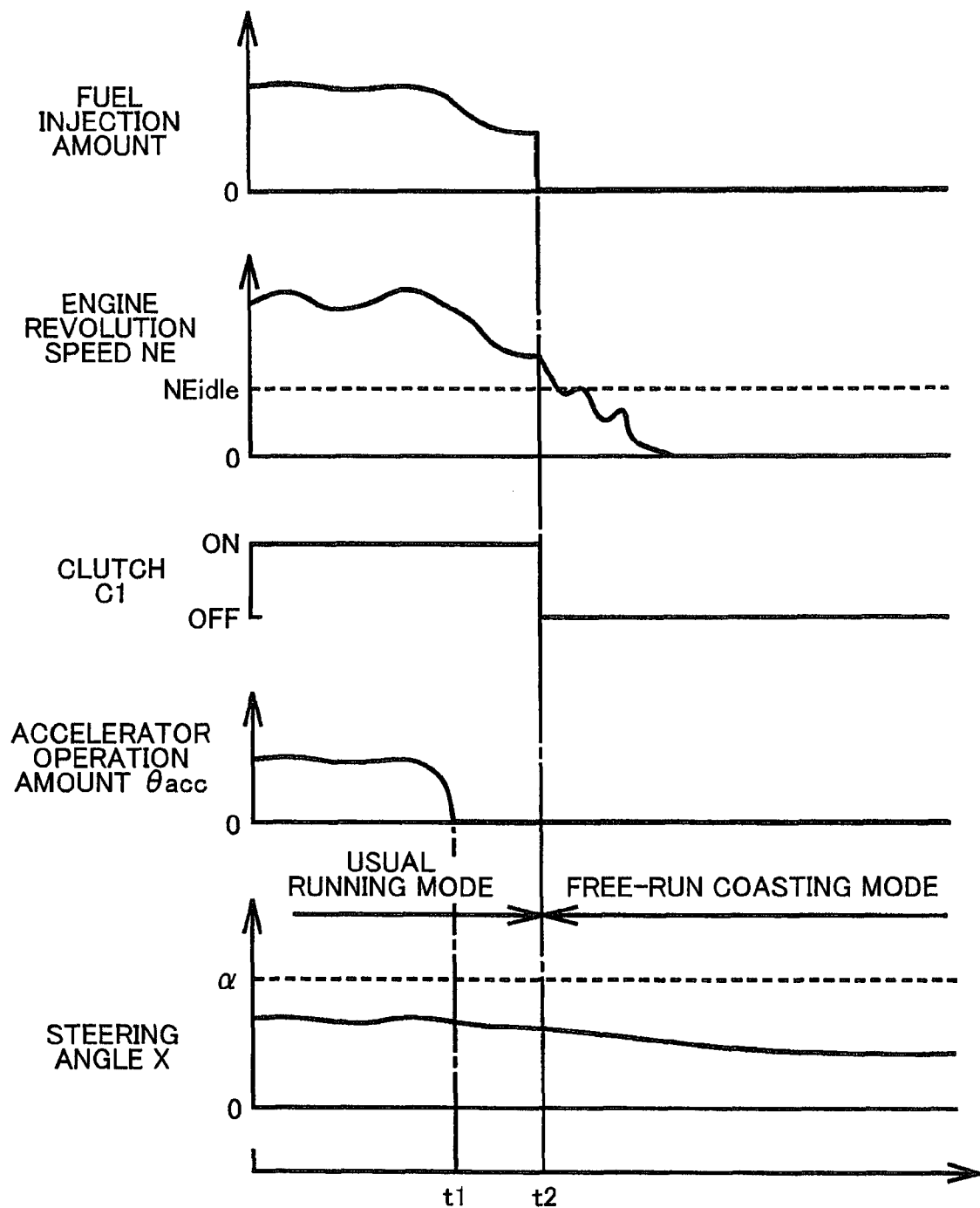
FIG. 6 is an example of a time chart illustrating changes in the operation state of various units occurring when the execution of the free-run coasting mode is started according to the flowchart shown in FIG. 5.

FIG. 6 is an example of a time chart showing the variations in the operation state of various units when the coasting modes are executed according to the flowchart shown in FIG. 5. The cases (A) to (C) shown in FIG. 3 can be also realized with such a time chart. In the time chart shown in FIG. 6, the free-run coasting mode is executed when the steering angle X is equal to or less than the upper limit value α. At a timing t1, the accelerator is set OFF. After a certain time elapses (timing t2), the determination becomes YES (positive) in all of steps S1 to S3, step S4 is executed, the clutch C1 is disengaged (OFF), the fuel supply is cut off, and the execution of the free-run coasting mode is started.

Figure 7:
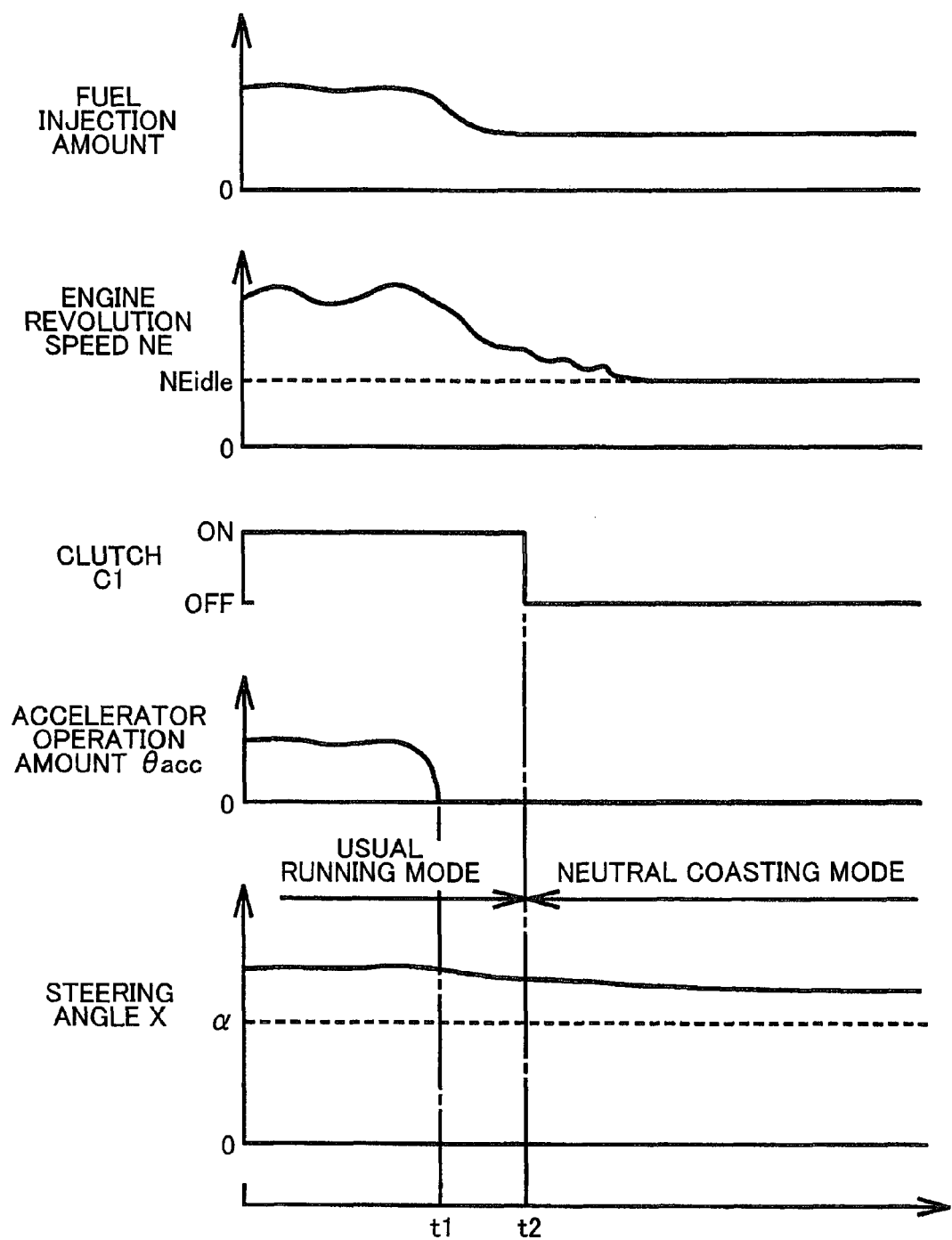
FIG. 7 is an example of a time chart illustrating changes in the operation state of various units occurring when the execution of the neutral coasting mode is started according to the flowchart shown in FIG. 5.

In the time chart shown in FIG. 7, the steering angle X is greater than the upper limit value α and the neutral coasting mode is executed. The cases (A) to (C) shown in FIG. 3 can be also realized with such a time chart. At a timing t1, the accelerator is set OFF. After a certain time elapses (timing t2), the determination of step S1 becomes YES (positive) and that of step S2 becomes NO (negative), step S5 is executed, the clutch C1 is disengaged (OFF), the engine 12 is controlled to the idle state, and the execution of the neutral coasting mode is started.

Figure 8:
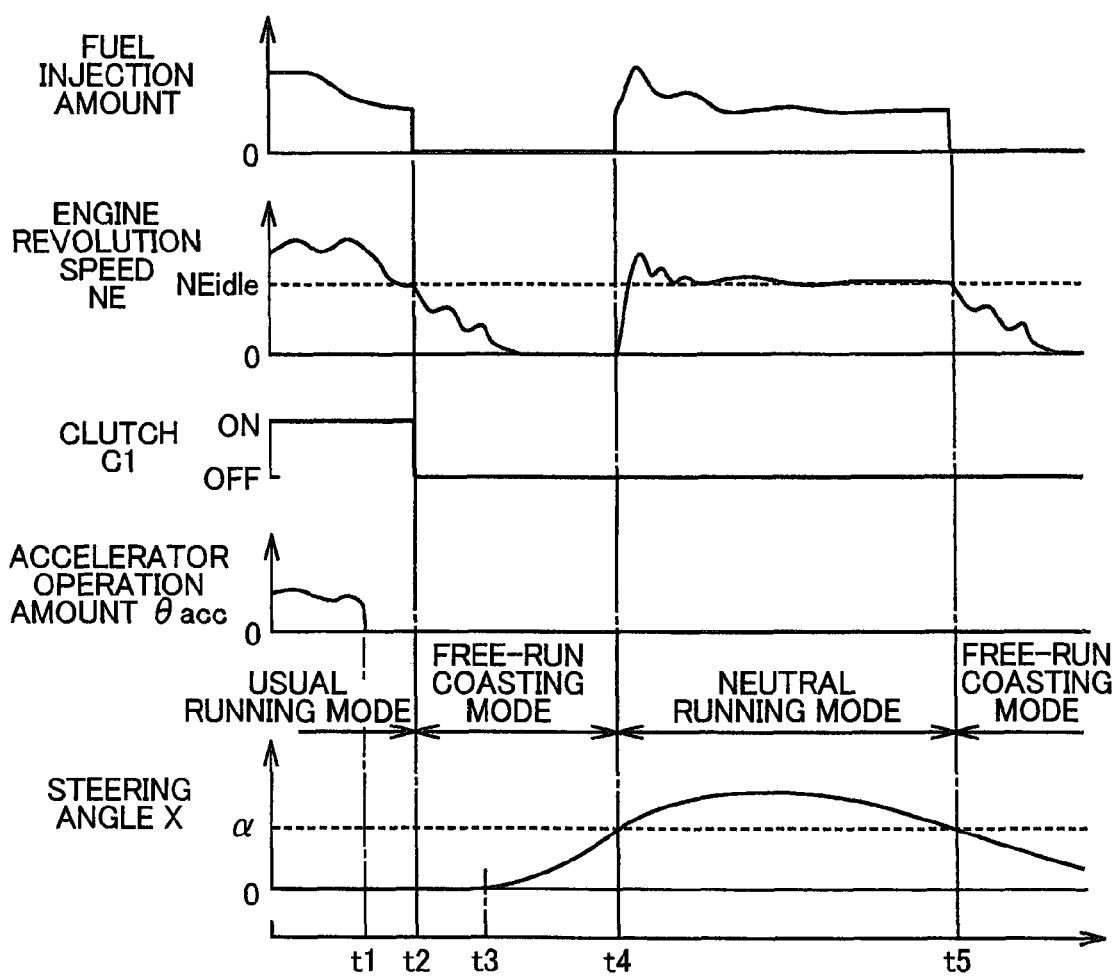
FIG. 8 is an example of a time chart illustrating changes in the operation state of various units occurring when the two coasting modes are switched according to the flowchart shown in FIG. 5 as the vehicle runs.

In the time chart shown in FIG. 8, the type of the coasting mode is switched according to the variations in the steering angle X after the execution of the free-run coasting mode has been started. The cases (A) to (C) shown in FIG. 3 can be also realized with such a time chart. At a timing t1, the accelerator is set OFF. After a certain time elapses (timing t2), the clutch C1 is disengaged (OFF), the fuel supply is cut off, and the execution of the free-run coasting mode is started in the same manner as shown in FIG. 6. At a timing t3 during the execution of the free-run coasting mode, the operation of the steering wheel 28 is started, and when the steering angle X exceeds the upper limit value α at a timing t4, a change-over is made to the neutral coasting mode, fuel injection is restarted, and the engine 12 is operated in the idle state (self-rotation). Where the steering angle X thereafter decreases and a state with X≤α is reached at a timing t5, a change-over is made again to the free-run coasting mode, the fuel supply is cut off, and the rotation of the engine 12 is stopped.

Thus, in the vehicle drive apparatus 10 of the embodiment the free-run coasting mode and the neutral coasting mode are both executed as the coasting modes, and the execution of the free-run coasting mode in which the rotation of the engine 12 is stopped is started subject to the steering angle X being equal to or less than the upper limit value α. In the free-run coasting mode, the alternator 22 cannot generate power. Therefore, where the driver performs a steering operation, the residual capacity SOC of the battery 24 decreases as the electric power steering system 26 operates. However, since the execution of the free-run coasting mode is started only in a range with a comparatively small steering angle X that is equal to or less than the upper limit value α, the decrease in the residual capacity SOC is small and the degradation of the battery 24 caused by variations in the residual capacity SOC is inhibited. Further, in the free-run coasting mode, since the rotation of the engine 12 is stopped, excellent improvement of fuel economy is obtained.

Meanwhile, the execution of the neutral coasting mode in which the engine 12 remains rotating is started even when the steering, angle X is greater, than the upper limit value α. In the neutral coasting mode, the battery 24 is charged by the power generated by the alternator 22. Therefore, the decrease in the residual capacity SOC of the battery 24 caused by the operation of the electric power steering system 26 is small and good battery performance is maintained. Further, since the neutral coasting mode is executed also in the range in which the steering angle X is greater than the upper limit value α, fuel economy is improved over that in the engine brake running mode.

Thus, different upper limits of the steering angle X are provided for starting the execution of the free-run coasting mode and the neutral coasting mode on the basis of whether or not the battery 24 can be charged, with consideration for power consumption on the operation of the electric power steering system 26. Therefore, the range of the steering angle X for executing the coasting mode while inhibiting the degradation of the battery 24 can be expanded and fuel economy can be further improved, regardless of power consumption on the operation of the electric power steering system 26.

Further, in the cases (B) and (C) shown in FIG. 3, the execution of the neutral coasting mode can be started also when the steering angle is in a range equal to or less than the upper limit value α. In the overlapping range equal to or less than the upper limit value α, the execution of either of the free-run coasting mode and the neutral coasting mode is selectively started according to the vehicle state or running state. Therefore, the opportunity for coasting can be increased and fuel economy can be further improved.

Further, since a change-over to the neutral coasting mode is made when the steering angle X exceeds the upper limit value α in the course of executing the free-run coasting mode, the coasting is performed while the battery 24 is charged by the power generated by the alternator 22 even in a range in which the steering angle X exceeds the upper limit value α. Thus, the degradation of the battery 24 caused by the decrease in residual capacity SOC is inhibited, regardless of the increase in power consumption caused by the operation of the electric power steering system 26. At the same time, the free-run coasting mode is executed when the steering angle is equal to or less than the upper limit value α and the neutral coasting mode is executed in the range above the upper limit value α, thereby enabling excellent improvement in fuel economy.

Further, when the steering angle X becomes equal to or less than the upper limit value α in the course of executing the neutral coasting mode, a change-over to the free-run coasting mode is made under a certain condition. The steering angle X becoming equal to or less than the upper limit value α means that the steering wheel 28 is returned, and in this case, power consumption on the operation of the electric power steering system 26 is reduced. Therefore, by changing over to the free-run coasting mode and stopping the rotation of the engine 12, it is possible to obtain excellent improvement in fuel economy while inhibiting the degradation of the battery 24 caused by the decrease in residual capacity SOC.

Figures 9, 10:
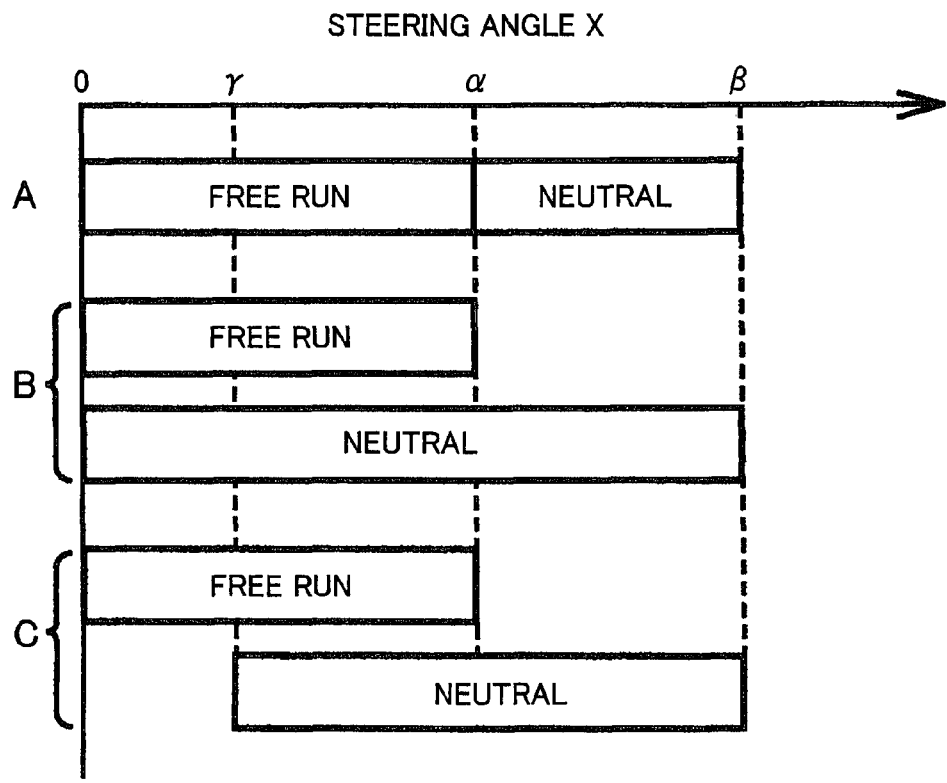
FIG. 9 shows another embodiment of the invention; this figure illustrates the difference in the execution range between the free-run coasting mode and the neutral coasting mode, the difference being associated with the steering angle X.
FIG. 10 shows yet another embodiment of the invention; this figure illustrates three running modes executed by the vehicle drive apparatus shown in FIG. 1.

Another embodiment of the invention will be explained below. In this embodiment, when the steering angle X is greater than the upper limit value α, the neutral coasting mode is executed without setting an upper limit, but an upper limit value β (>α) can be also set for the neutral coasting mode as shown in FIG. 9. Thus, when the steering angle X is greater than the upper limit value β, the usual running mode is continuously executed as is, and where the steering angle is equal to or less than the upper limit value β, the execution of the neutral coasting mode is started. Further, when the steering angle X exceeds the upper limit value β in the course of executing the neutral coasting mode, the neutral coasting mode may be ended and a return may be made to the usual running mode.

Further, in the embodiment, the neutral coasting mode is executed as the second coasting mode, but as shown in FIG. 10, a cylinder cut-off coasting mode may be also executed instead of the neutral coasting mode. Thus, a cylinder cut-off coasting unit is provided instead of the neutral coasting unit 56, and the cylinder cut-off coasting mode is executed. In the cylinder cut-off coasting mode, fuel supply to the engine 12 is stopped—F/C—in a state in which the engagement of the clutch C1 is maintained and the engine 12 is connected to the wheels 20, and all of a plurality of cylinders are stopped by the cylinder cut-off device of the engine controller 30 at positions in which the intake/exhaust valves of the cylinders are all closed.

In such a cylinder cut-off coasting mode, since the crankshaft of the engine 12 is driven and rotated, the energy brake force is larger than that in the case of the neutral coasting mode, and the running distance in the coasting mode is relatively short, but since the supply of fuel to the engine 12 is cut off, fuel economy can be improved to the same degree as in the case of the neutral coasting mode or to a higher degree. Further, since the crankshaft of the engine 12 is driven and rotated according to the vehicle speed V, the battery 24 can be charged by the power generated by the alternator 22, in the same manner as in the neutral coasting mode. As a result, in the embodiment, the operation effect similar to that of the above-described embodiment is obtained although the cylinder cut-off coasting mode is executed instead of the neutral coasting mode.

The upper limit values a and β and the lower limit value γ relating to the steering angle X, or other execution enabling conditions for executing the cylinder cut-off coasting mode may be same as those of the above-described embodiment, or different conditions may be set. Further, as the second coasting mode the neutral coasting mode and the cylinder cut-off coasting mode may be executed in combination, depending on conditions.

While the invention has been described herein in terms of embodiments illustrated by the appended drawings, these embodiments are to be understood as illustrative, and various changes and modifications thereof will be apparent to those skilled in the art.

The invention claimed is:

1. A vehicle comprising:

an engine;

an alternator configured to generate power by rotation of the engine;

a battery configured to accumulate power generated by the alternator;

a steering member operated by a driver;

an electric power steering system configured to assist the driver to operate the steering member by using power of the battery;

a steering angle acquisition unit configured to acquire a steering angle of the steering member; and an electronic control unit configured to be capable of controlling a coupled engine running mode, in which the engine is coupled to wheels and engine brake is activated by driven rotation of the engine, and a coasting mode, in which an engine brake force is reduced with respect to that in the coupled engine running mode with the engine brake engaged, and also configured to start the coasting mode based on the steering angle of the steering member;

the electronic control unit being configured to start an execution of a first coasting mode when the steering angle is equal to or less than a preset upper limit value and start an execution of a second coasting mode when the steering angle is greater than the upper limit value, the first coasting mode being a coasting mode in which an engine rotation is stopped, and the second coasting mode being a coasting mode in which the engine remains rotating.

2. The vehicle according to claim 1, wherein the electronic control unit is configured to start the execution of the second coasting mode also when the steering angle is in a range equal to or less than the upper limit value, and selectively start the execution of the first coasting mode or the second coasting mode in the range equal to or less than the upper limit value.

3. The vehicle according to claim 1, wherein the electronic control unit is configured to perform control to change over to the second coasting mode when the steering angle exceeds the upper limit value in the course of executing the first coasting mode.

4. The vehicle according to claim 1, wherein the electronic control unit is configured to perform control to change over to the first coasting mode when the steering angle is equal to or less than the upper limit value in the course of executing the second coasting mode.

5. The vehicle according to claim 1, wherein in the first coasting mode, the engine is disconnected from the wheels and fuel supply to the engine is stopped to stop the engine rotation, and in the second coasting mode, fuel is supplied to actuate the engine in a state in which the engine is disconnected from the wheels.

6. The vehicle according to claim 1, wherein in the first coasting mode, the engine is disconnected from the wheels and fuel supply to the engine is stopped to stop the engine rotation, and in the second coasting mode, fuel supply to the engine is stopped, while the engine remains coupled to the wheels, and the operation of at least one of a piston and an intake and exhaust valve in at least one of cylinders of the engine is stopped.

7. The vehicle according to claim 1, further comprising a residual capacity acquisition unit configured to acquire a residual capacity of the battery, wherein the electronic control unit is configured to variably set the upper limit value and sets a smaller upper limit value when the residual capacity of the battery is small than when the residual capacity of the battery is large.

* * * * *